United States Patent [19]

Kaspar

[11] Patent Number: 5,405,028
[45] Date of Patent: Apr. 11, 1995

[54] CRANE VEHICLE

[75] Inventor: Ernst Kaspar, Munderkingen, Germany

[73] Assignee: EC Engineering+Consulting Spezialmaschinen GmbH, Ulm, Germany

[21] Appl. No.: 194,355

[22] Filed: Feb. 10, 1994

[30] Foreign Application Priority Data

Feb. 18, 1993 [DE] Germany .................. 9302376 U

[51] Int. Cl.⁶ ............................................. B60K 41/28
[52] U.S. Cl. .................... 212/163; 180/306; 180/308; 180/327; 212/231
[58] Field of Search .......... 212/163, 230, 231, 232; 180/306, 308, 326, 327

[56] References Cited

U.S. PATENT DOCUMENTS

| 3,249,336 | 5/1966 | Brown et al. | 212/163 |
|---|---|---|---|
| 3,885,677 | 5/1975 | Görl et al. | |
| 4,053,061 | 10/1977 | Lester | 180/327 |
| 4,140,199 | 2/1979 | Lester | 180/327 |
| 4,177,869 | 12/1979 | Crabiel | 212/247 |
| 4,189,021 | 2/1980 | Scheuerpflug et al. | 180/306 |
| 4,716,729 | 1/1988 | Kakeya . | |
| 5,213,222 | 5/1993 | Becker . | |

FOREIGN PATENT DOCUMENTS

| 325064 | 7/1989 | European Pat. Off. . |
|---|---|---|
| 2181565 | 12/1973 | France . |
| 2142750 | 4/1973 | Germany . |
| 2300643 | 7/1974 | Germany . |
| 2455961 | 8/1976 | Germany . |
| 2837398 | 3/1980 | Germany . |
| 3640183 | 7/1987 | Germany . |
| 9001589 | 6/1990 | Germany . |
| 2056407 | 3/1981 | United Kingdom . |
| 2066430 | 7/1981 | United Kingdom . |
| 2082984 | 3/1982 | United Kingdom . |
| 2218397 | 11/1989 | United Kingdom . |

Primary Examiner—Michael S. Huppert
Assistant Examiner—Thomas J. Brahan
Attorney, Agent, or Firm—Rothwell, Figg, Ernst & Kurz

[57] ABSTRACT

A crane vehicle which reaches a minimum traveling speed of 62 km/h on public roads and gives the vehicle driver a range of vision with a radius of not more than 12 m comprises a vehicle frame which is substantially lowered to the level of the centers of the vehicle wheels, with at least part of the vehicle wheels being provided with hydrostatic individual wheel drives that are respectively arranged in the area of the wheel hubs. Furthermore, the crane vehicle comprises motor means for travel operation and crane operation, with said motor means being supported above the vehicle frame in a turntable which is supported on the vehicle frame in a horizontally pivotable manner. When viewed in the direction of travel, a driver's cab is mounted upstream of the motor means on the turntable, and a split longitudinal spindle which is mechanically lockable with the steering means for the vehicle wheels for travel operation is provided in the area of the driver's cab. The boom of the crane vehicle is adapted to be placed with its front end on the low-lying vehicle frame and has a basic boom length corresponding substantially to the length of the vehicle frame.

6 Claims, 1 Drawing Sheet

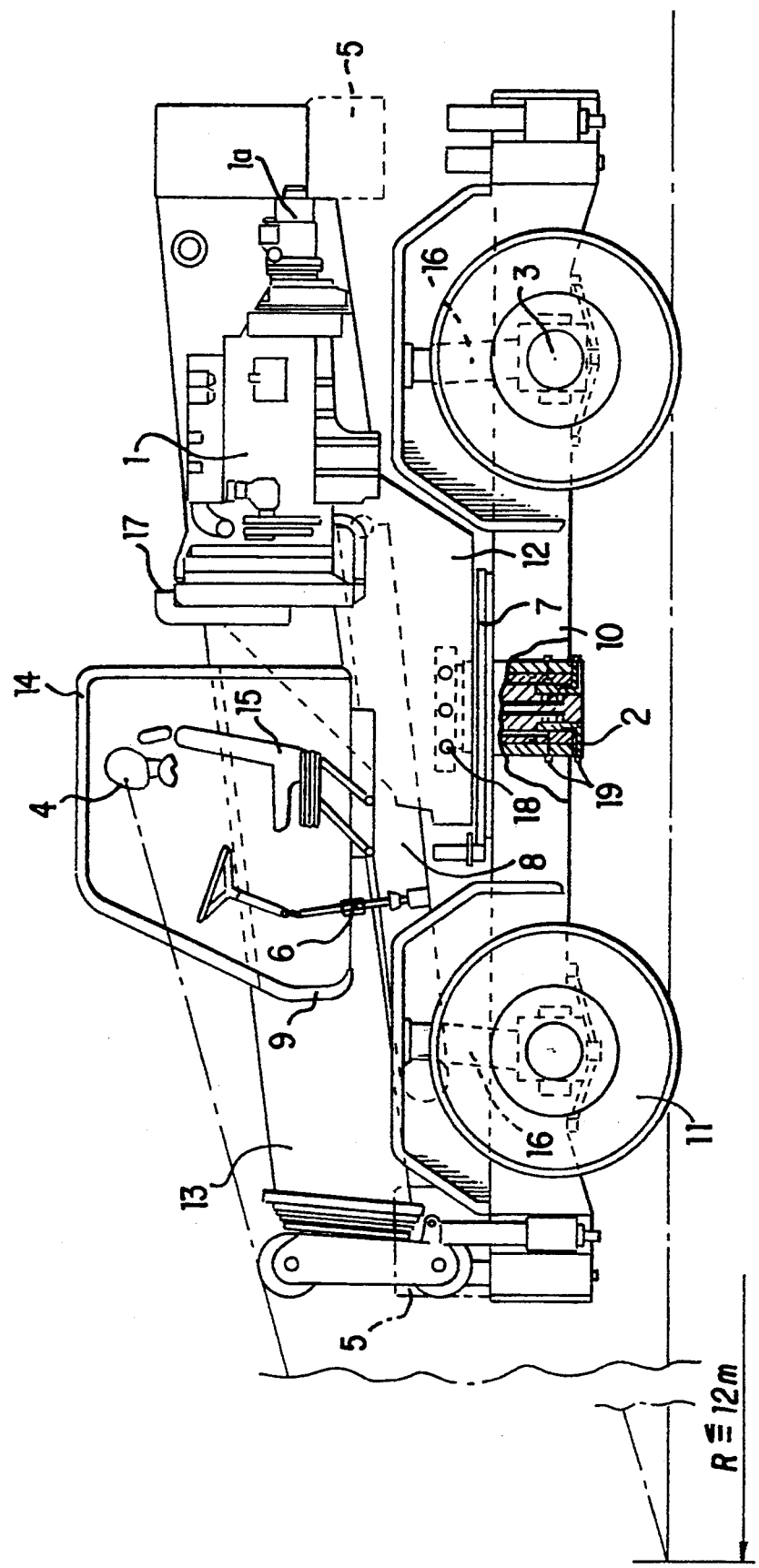

CRANE VEHICLE

BACKGROUND OF THE INVENTION

The present invention relates to a crane vehicle.

Crane vehicles enjoy great popularity because they even move on public roads and can thus be made rapidly available at different places of use.

However, the desire for increasingly greater lifting heights and increasingly heavier loads to be lifted conflicts with various provisions, e.g., those laid down in the Regulations Authorizing the Use of Vehicles for Road Traffic (STVZO) that are applicable in Germany. These define the overall weight, the axle load distribution, the field of vision of a driver and many other things.

Furthermore, the technically quite feasible increase in crane vehicle dimensions is impeded by obstacles such as the clearance heights of road bridges or the entrance heights of factory halls. Moreover, spatial constraints on sites or within manufacturing installations confine the vertical, longitudinal and lateral dimensions of crane vehicles.

It is therefore the object of the present invention to develop a crane vehicle as is described below in such a manner that it can be used in many ways, even in case of spatial confinements, can be moved easily and rapidly from place to place and is very efficient despite its small dimensions.

This object is achieved by a crane vehicle constructed according to the present invention.

SUMMARY OF THE INVENTION

The technical progress which can be achieved with the help of the crane vehicle of the invention is primarily due to the fact that the vehicle construction effects an especially small overall height, whereby it is possible to move under low road briges or low gates of halls in an easy way. As such, the crane vehicle of the invention is suited for autobahns (freeways) within the meaning of the Regulations Authorizing the Use of Vehicles for Road Traffic (STVZO), i.e. a minimum traveling speed of 62 km/h is possible and a mechanical steering action on the vehicle wheels to be steered is ensured for traveling speeds of more than 62 km/h. Furthermore, the construction of the crane vehicle of the invention permits a range of vision as is required under STVZO with a radius of $R \leqq 12$ m to be achieved by placing the crane boom at a low level and by way of a short basic boom length of the crane boom despite the small overall height.

The arrangement of a joint motor means for both travel operation and crane operation in the rear end of the turntable is of special importance to the inventive construction, which effects the advantageously small overall height. This arrangement of travel drive and crane drive in the turntable, i.e., essentially above the rear vehicle wheels, permits, on the one hand, the arrangement of the vehicle frame substantially at the level of the centers of the vehicle wheels and permits, on the other hand, a decrease in the counterweight needed in or on the turntable by the weight of the motor for travel drive and crane drive.

The hydrostatic individual drives (hydraulic motors) which are integrated into the hubs of the vehicle wheels and which do not require any connection to the vehicle frame by way of cardan shafts or the like, thereby making it possible to lower the vehicle frame substantially to the level of the wheel hubs, play an important role in the achievement of the advantageous low height of the crane vehicle of the invention.

Furthermore, the fact that the driver's cab can be bolted to the chassis during travel operation together with the split steering spindle (which is made hydraulically unlockable) permits travel on speedways, such as autobahns, in compliance with the Regulations Authorizing the Use of Vehicles for Road Traffic (STVZO).

DESCRIPTION OF THE DRAWING

The invention will now be described in more detail with reference to a preferred embodiment and with reference to the single drawing which diagrammatically illustrates the crane vehicle according to the invention.

DESCRIPTION OF THE DRAWING

As shown in the drawing, the crane vehicle comprises a deflection-resistant and torsion-proof vehicle frame 10 on which wheels 11 are individually suspended in pairs. Up to a nominal load of 35/40 t, the illustrated vehicle has only two pairs of wheels to achieve the short overall length aimed at. Increased nominal loads of, e.g., 70 t can be achieved with only three pairs of wheels owing to the construction of the invention whereas in the prior art, nominal loads of such a great magnitude can only be achieved with the aid of (at least) four axles.

Wheels 11 are at least partly steerable with the aid of a steering means which includes a divisible steering spindle 6. The divisible steering spindle is lockable and unlockable in a hydraulic manner and ensures the presence of a mechanical steering engagement when the crane vehicle moves at speeds of more than 62 km/h on public roads (autobahns).

Furthermore, there is provided a turntable 12 which is supported on vehicle frame 10 in a horizontally pivotable manner and whose rotational axis is arranged in the area of a rotary leadthrough 2 (to be described in more detail further below) for the wheel drives.

A combined travel and crane motor 1 is provided in the rear portion of the turntable 12 above the rear half of the vehicle frame, i.e., substantially above the pair of rear wheels. This driving motor for travel operation and crane operation is preferably designed as a diesel engine and drives a travel pump 1a for hydraulic oil. Hydraulic oil flows through flexible tubes (not shown) from travel pump 1a to the rotary leadthrough 2 and from there to the hydrostatic wheel drives 3. The hydrostatic wheel drives are supplied with hydraulic oil either through spring cylinders 16 assigned to each wheel 11 or through the wheel suspension (not shown in detail) of the driven vehicle wheels.

The rotary leadthrough 2 is provided within the vehicle frame 10 which has a cutout at that place, but is sufficiently reinforced from a constructional point of view. The rotary leadthrough 2 is exactly positioned in the center with respect to the ball-type slewing ring 7 which establishes the connection between vehicle frame 10 and turntable 12.

The rotary leadthrough 2 consists in principle of two members that can be rotated relative to each other, with one of said members being mounted on vehicle frame 10 and the other rotational member being entrained by turntable 12. The first subassembly of the rotary leadthrough 2 that is fixedly secured to the vehicle frame 10 is narrowly hatched in the drawing (hatching from the left side, bottom, to the right side, top) whereas the second subassembly of the rotary leadthrough that is fixedly secured to turntable 12 is broadly hatched in the drawing (hatching from the left side, top, to the right side, bottom).

The second subassembly which rotates along with turntable 12 has formed therein oil supply channels which are connected with their upper ends to hydraulic oil inlets, of which three are diagrammatically illustrated in the drawing and designated by reference numeral 18. Each of said oil supply channels terminate in an annular channel which is open to the respectively adjacent component of the first subassembly fixed onto the frame. Hydraulic oil supply lines which are formed in the members fixed onto the frame and through which oil flows from the respective annular channels to the outer surface of the subassembly fixed onto the frame open each into said annular channels (of the rotational subassembly).

This construction ensures that, irrespective of the rotational position of the rotational subassembly relative to the subassembly fixed onto the frame, hydraulic oil flows in an unimpeded way from the hydraulic oil inlets 18 of the rotational subassembly to the outlet connections of the subassembly fixed onto the frame. These hydraulic oil outlet connections are diagrammatically illustrated in the drawing, two of said connections being designated by reference numeral 19.

To be able to handle great amounts of hydraulic oil despite a relatively small height of the annular channels, four oil supply channels are provided in the rotational subassembly, to which end the subassembly fixed to the frame is made of two shells, of which the inner shell is guided from the interior to the outside such that it is bent at a right angle so as to transport the four oil passages illustrated in the drawing to the four oil outlet connections 19 shown in the drawing.

To return hydraulic oil from the consumers, such as the hydrostatic wheel drives 3, to the hydraulic oil tank, separate oil return passages and annular return channels which adhere to the same constructional principle as the above-described passage of hydraulic oil through the subassemblies of leadthrough 2 are provided in the rotary leadthrough. The drawing just illustrates four annular channels of the oil return system because the associated oil supplies do not extend in the plane of cutting.

A telescopic crane boom 13 which in the illustrated embodiment comprises a basic boom and seven retractable and extendable telescopic members is connected to turntable 12 and pivotally hinged thereto in vertical direction. Crane boom 13 is moved with the aid of a rocking cylinder 8 from its inoperative or transportation position, illustrated in the drawing, into its operative position (not shown). The travel and crane motor 1 acts with its quite considerable dead weight as a counterweight for crane boom 13. The amount of the counterweight arranged in or on turntable 12, which amount is prescribed by the specification of the crane vehicle manufacturer, can thus be reduced by the weight of the travel and crane motor 1, whereby the total weight of the crane vehicle is reduced by the weight of the travel and crane motor 1. If the travel and crane motor 1 was not arranged in turntable 12, a counterweight which is additionally carried along would have to be made heavier by the weight of motor means 1 for crane operation.

The above-explained reduction of the overall vehicle weight by the arrangement of the travel and crane motor in the turntable enables the construction of the invention to need only two axles, as is shown in the drawing, for lifting performance and jib lengths that require three axles in the prior art. The absence of a third axle, however, permits the small overall length of the crane vehicle of the invention as is desired.

Furthermore, the crane vehicle comprises a driver's cab 14 which is arranged in the direction of travel in front of the travel and crane motor 1 and has a driver's seat 15 disposed therein.

The vehicle frame 10 is substantially lowered to the level of the centers of wheels 11, with at least part of the wheels being provided with the above-mentioned hydrostatic individual drives 3 which, in turn, are arranged in the area of the hubs of the driven wheels 11.

During travel the driver's cab 14 may be bolted to the chassis, which is predominantly performed together with the hydraulic locking of the split steering spindle 6 to ensure the mechanical steering engagement as is required in the Regulations Authorizing the Use of Vehicles for Road Traffic when traveling speeds of more than 62 km/h are reached.

Crane boom 13 can be placed with its front end on the lowermost vehicle frame 10. Furthermore, the crane boom has such a small basic boom length that the crane boom length substantially corresponds to the length of the vehicle frame.

As illustrated in the drawing by reference numeral 4, a driver in the driving position of the crane vehicle enjoys an unhindered all-around view within the radius of vision of not more than 12 m as required in the Regulations Authorizing the Use of Vehicles for Road Traffic. This unhindered all-around view for the driver should specifically be noted because it has been accomplished, e.g., not by increasing the driver's position, without the implementation of a surprisingly small overall vehicle height.

An additional counterweight 5 for crane operation can be placed in the travel mode in the front region of the crane vehicle, preferably on the front end section of vehicle frame 10. During crane operation the additional counterweight 5 can be arranged on the rear end of turntable 12, as shown in dash-dotted fashion in the drawing. If, as discussed above, the travel and crane motor 1 was not arranged in turntable 12, the additional counterweight 5 would have to be made heavier by the weight of motor 1 so as to apply the counterweights needed according to the conventional crane tables.

The driver's cab has a removable top for reducing the overall height of the crane vehicle in case of need. Furthermore, the driver's seat 15 which is provided in the driver's cab can be deflected to such an extent that the driver's head is movable below the highest vehicle edge 17.

The hydraulic oil is supplied to the hydrostatic wheel drives 3, as already stated above, via the rotary leadthrough 2. The hydraulic oil is fed to the respectively driven vehicle wheels 11 either by spring cylinders associated with each wheel or by the wheel suspension which is assigned to each wheel if there are no spring cylinders.

I claim:
1. A crane vehicle comprising:
a deflection-resistant and torsion-proof vehicle frame, a superstructure and a chassis;

a plurality of wheels individually suspended on the vehicle frame, and steering means for steering at least some of the wheels;

a turntable supported on the vehicle frame in a horizontally pivotable manner with respect to the frame;

a telescopic crane boom which is secured to and pivotable along with the turntable and movable in a vertical direction;

a single motor for operating the vehicle during travel and for operating the crane;

a single driver cab with a driver seat disposed therein;

wherein the vehicle frame is positioned at a level substantially corresponding to the centers of the wheels, and at least some of the wheels are provided with hydrostatic individual wheel drives arranged near the hubs thereof to provide the vehicle with a low overall height;

wherein the single motor is arranged on the turntable above the vehicle near a rear portion of the frame and acts as a counterweight during crane operation, and the driver cab is secured to the turntable forward of the motor and is adapted to be bolted to the chassis during travel of the crane vehicle;

wherein a split steering spindle is provided adjacent the driver cab and is mechanically lockable with the steering means for travel operation of the vehicle; and wherein the crane boom has a front end which is positionable on the vehicle frame to provide a substantially unobstructed field of vision for a person driving said vehicle during travel thereof, and has a basic boom length substantially corresponding to the length of the vehicle frame to provide a decreased overall vehicle length.

2. A crane vehicle according to claim 1, wherein said motor means comprises a hydraulic oil travel pump which is connected to said hydrostatic wheel drives, with the area of the rotational axis of said turntable within said vehicle frame having provided therein a rotary leadthrough for said hydraulic oil for supplying said hydaulic oil from said leadthrough to said wheel drives.

3. A crane vehicle according to claim 1 or 2, wherein a locally movable counterweight is provided for crane operation, said counterweight being adapted to be placed in the area of the front end of said vehicle frame in the travel mode and being adapted to be secured in the area of the rear end of said turntable during crane operation.

4. A crane vehicle according to any one of claims 1 or 2, wherein said driver cab has a removable top and said driver seat which is provided in said driver cab is adapted to be lowered to such a degree that the driver's head is movable below the highest vehicle edge outside said cab.

5. A crane vehicle according to claim 1 or 2, wherein hydraulic oil can be supplied to said hydrostatic wheel drives through spring cylinders assigned to each wheel.

6. A crane vehicle according to claim 1 or 2, characterized in that hydraulic oil can be supplied to said hydrostatic wheel drives through a wheel suspension assigned to each wheel.

* * * * *